Feb. 14, 1961  G. N. CONTI ET AL  2,971,870
CYCLING OF BELLOWS
Filed Oct. 25, 1957
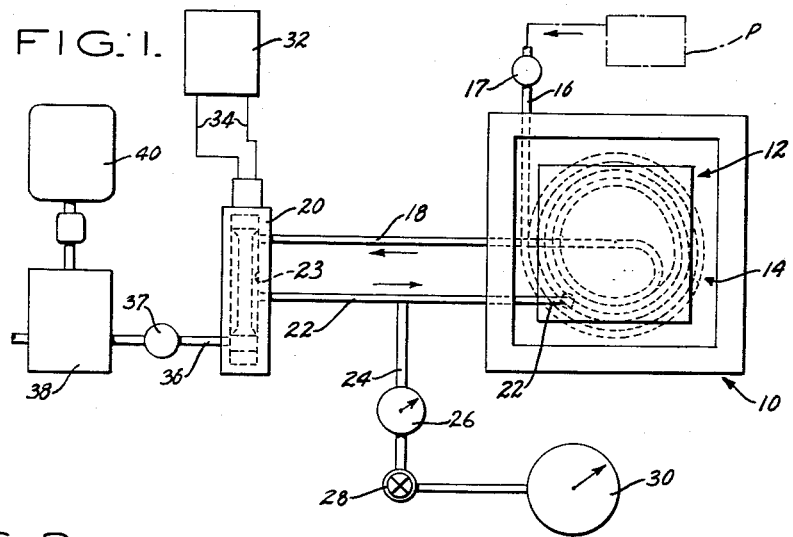
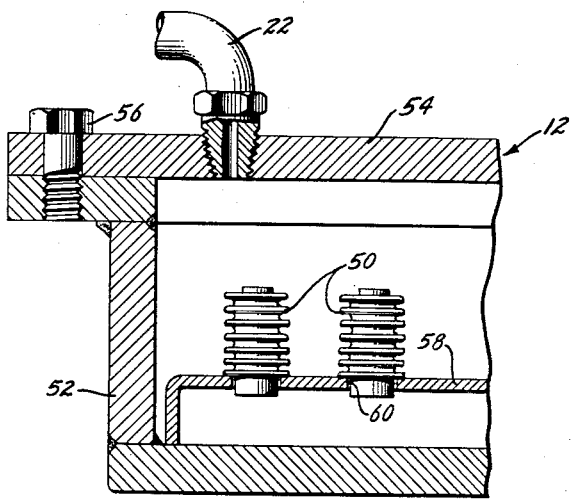
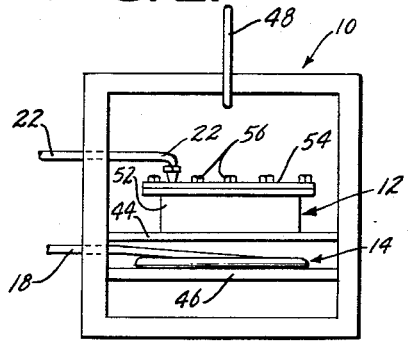
INVENTORS
GIRARD N. CONTI
EDWARD S. STANKOWSKI
BY United States Patent Office 2,971,870
Patented Feb. 14, 1961

2,971,870
CYCLING OF BELLOWS

Girard N. Conti, Mount Clemens, and Edward S. Stankowski, Centerline, Mich., assignors to Holley Carburetor Company, Van Dyke, Mich., a corporation of Michigan Filed Oct. 25, 1957, Ser. No. 692,373

7 Claims. (Cl. 148—13)

This invention relates to filled or evacuated metal bellows and more specifically to the method and apparatus for stabilizing the bellows after sealing.

All metals contain, to a certain degree, internal stresses which must be relieved in the bellows before it is actually put to its intended use. If these stresses are not relieved prior to use, the performance of the bellows will be affected and repeatability destroyed.

One of the conventional methods used in relieving these stresses is to cycle the filled bellows in a temperature controlled atmosphere. This is done by placing the bellows in a suitable chamber, introducing air into the same until a desired pressure is obtained and then heating the chamber. After this, the same chamber is evacuated to some other desired pressure and the same temperature again maintained.

The difficulty in this simple scheme is that it is a rather time consuming process, in that fresh air introduced every time the desired higher pressure is reached requires heating to bring it to the desired temperature. This causes a delay which represents a high percentage of the entire cycle time.

It is therefore the object of this invention to provide an improved method and apparatus for removing these internal stresses.

More specifically, it is an object to provide an improved method and apparatus for this purpose, involving the cycling of the bellows, within a sealed pressure chamber, by subjecting the same to a sequence of super-atmospheric and sub-atmospheric conditions in the chamber, while simultaneously and continuously preheating air for this pneumatic cycling to a temperature considerably in excess of ambient atmospheric temperature, thereby reducing the time of the cycle to the extent of the period of time heretofore required in properly heating up the air between super-atmospheric and sub-atmospheric pressure applications.

The foregoing as well as other objects will become more apparent as this description proceeds, especially when considered in connection witht the accompanying drawing, illustrating a preferred embodiment of the invention, wherein:

Fig. 1 is a layout in plan illustrating schematically an improved apparatus for carrying out the method of the invention;

Fig. 2 is a vertical section illustrating details of an oven unit of the apparatus; and Fig. 3 is a fragmentary further vertical section in enlarged scale of the pressure chamber of the apparatus.

Referring to Fig. 1, a temperature controlled oven is generally designated 10, within which oven are placed a pressure chamber 12 and coiled tubing 14. The internal volume of the coil 14 is greater than that of pressure chamber 12. A conduit 16 containing a pressure regulator valve 17 leads from an external source of air pressure P to one end of the coil 14. Another conduit 18 leads from the other end of the coil 14 to an external solenoid valve 20; while a third conduit 22 leads from the same valve 20 to communicate its plunger bore 23 with the pressure chamber 12. A lateral conduit 24 communicates with conduit 22 and has series-connected therein a compound pressure gage 26, a shut-off valve 28 and an absolute pressure gage 30, in that order from conduit 22.

Movements of solenoid valve 20 are controlled by a cycle timer 32 electrically connected to the valve 20 by electrical conductors 34. A conduit 36 containing a vacuum bleed valve 37 leads from the solenoid valve 20 and communicates with a vacuum pump 38, which is driven by an electric motor 40.

Referring to Fig. 2, the pressure chamber 12 is shown positioned on a suitable shelf 44 within the oven 10. The coiled tubing 14 is also placed on a similar shelf 46 below the pressure chamber 12. Conduit 22 leads from a top zone of the pressure chamber 12 and conduit 18 leads horizontally from one end of coil 14. A thermometer 48 which can be visibly read is positioned at the top of the oven 10 in a suitable manner.

Fig. 3 shows the arrangement of sealed bellows units 50 within the pressure chamber 12. As there shown, chamber 12 is comprised of a lower box-like portion 52 and a cover plate 54 into which conduit 22 is tapped and secured. This cover plate is secured to the lower portion by bolts 56. A bellows positioning tray 58, placed within the lower portion 52 of pressure chamber 12, contains a plurality of holes 60 into which one end of the bellows 50 fits.

In order to best describe the operation, certain conditions and requirements may be assumed. The following data, therefore, should be considered strictly as illustrative assumptions and not limitations of or on the invention:

(A) The bellows 50 are to be cycled between pressures of 5" Hg and 55" Hg absolute external.

(B) The cycling is to be done at a temperature of 250° F.

(C) Each bellows is to be cycled 2000 times.

(D) External source P of air pressure is regulated to a value of about 80 pounds per square inch.

(E) Temperature of oven 10 is maintained at 280° F.

(F) Timer 32 is set at 6 cycles per minute.

The sequence of operation with the assumed conditions is as follows: The external source P of superatmospheric pressure communicates through conduit 16, under control of valve 17, with the coil 14, which as stated above has a volume greater than that of the pressure chamber 12. The air so introduced is preheated by the oven 10. At this same instant the air which was in the coil 14 before, at the desired temperature, is forced through conduit 18 into solenoid valve 20. This, it will be assumed, has been positioned by timer 32 as shown in Fig. 1, so that it permits continued air flow through valve bore 23, then through conduit 22 into the pressure chamber 12. The air continues to flow until a pressure of 55" Hg is indicated by the compound pressure gage 26.

Naturally, the pressure within the pressure chamber 12 is determined by the setting of the pressure regulator valve 17, so that in this example the valve 17 would be set at approximately 24 pounds per square inch.

The timer 32 is so set that when the pressure in chamber 12 reaches 55" Hg, indicated by the pressure gage 26, the timer actuates solenoid valve 20, which then moves so that conduit 18 is closed and conduit 36 is opened to the valve bore 23. Conduit 22 is never closed by the solenoid valve.

At this time the vacuum pump 38 is placed in communication through conduit 36 with chamber 12 and proceeds to evacuate said chamber. The degree of evacuation is controlled by the bleed valve 37 in conduit 36.

The function of the timer 32 now is the same as in the previous half of the cycle, in that as the pressure in chamber 12 drops to 5" Hg the timer causes the solenoid to re-close conduit 36 and open conduit 18. The previous half of the cycle is now repeated.

It can readily be seen that the pressure-vacuum cycling would take a much longer period of time, assuming the same desired temperature condition, if the air were not preheated as described. The time per cycle has been greatly reduced over prior methods because the air which is used as the pressure medium is always being preheated at the same time as the bellows are being cycled. Therefore, instead of having in one cycle a sequence of operations involving steps of charging the chamber 12 to desired pressure, heating to desired temperature, and evacuating to correct minus pressure, the improved cycle of the invention becomes simply a sequence of charging the chamber to pressure while preheating and evacuating to correct minus pressure while maintaining heat.

The drawings and the foregoing specification constitute a description of the improved cycling of bellows in such full, clear, concise and exact terms as to enable any person skilled in the art to practice the invention, the scope of which is indicated by the appended claims.

What we claim as our invention is:

1. Apparatus for cycling bellows and like units to stress-relieve the same, comprising means providing a sealed pressure chamber to receive said units, said chamber having an air conduit in communication with its interior, an air preheating unit having an air conduit communicating therewith and connected with a source of super-atmospheric pressure, means for coordinately preheating said unit and maintaining said chamber at a predetermined internal temperature, said unit having a further conduit communicating therewith, a source of sub-atmospheric pressure and valve means controlling communication of said respective last named conduits and said chamber conduit with said respective sources of super-atmospheric and sub-atmospheric pressure.

2. Apparatus for cycling bellows and like units to stress-relieve the same, comprising means providing a sealed pressure chamber to receive said units, said chamber having an air conduit in communication with its interior, an air preheating and circulating coil having an air conduit communicating with an end thereof and connected with a source of super-atmospheric pressure, means for coordinately preheating said coil and maintaining said chamber at a predetermined internal temperature, said coil having a further conduit communicating therewith at its end opposite said last named conduit, a source of sub-atmospheric pressure, and valve means controlling communication of said respective coil conduits and said chamber conduit with said respective sources of super-atmospheric and sub-atmospheric pressure.

3. Apparatus for cycling bellows and like units to stress-relieve the same, comprising means providing a sealed pressure chamber to receive said units, said chamber having an air conduit in communication with its interior, an air preheating and circulating coil having an air conduit communicating with an end thereof and connected with a source of super-atmospheric pressure, an oven in which said chamber means and coil are disposed for coordinately preheating said coil and maintaining said chamber at a predetermined internal temperature, said coil having a further conduit communicating therewith at its end opposite said last named conduit, a source of sub-atmospheric pressure, and valve means controlling communication of said respective coil conduits and said chamber conduit with said respective sources of super-atmospheric and sub-atmospheric pressure.

4. Apparatus for cycling bellows or like units, comprising means providing a space for receiving units for cycling, means to heat said space to a predetermined temperature in substantial excess of the ambient temperature adjacent the latter, means to subject the units in said space to the action of fluid under different pressures to repeatedly flex the units while so heated, and means for circulating the pressure fluid in a separate closed path in heat transfer relation to said heated space to preheat the pressure fluid to approach said predetermined temperature while so flexing the units.

5. Apparatus for cycling bellows or like units, comprising means providing a space for receiving units for cycling, means to heat said space to a predetermined temperature in substantial excess of the ambient temperature adjacent the latter, means to subject the units in said space to the action of fluid under different alternating, super-atmospheric and sub-atmospheric pressures to repeatedly flex the units while so heated, and means for circulating the pressure fluid in a separate closed path in heat transfer relation to said heated space to preheat the pressure fluid to approach said predetermined temperature while so flexing the units.

6. The method of cycling bellows and like units to stress-relieve the same, comprising the steps of heating said bellows, in an externally sealed space, to a temperature in substantial excess of the ambient adjacent temperature and subjecting said bellows as so heated in said space to repeated fluid pressure changes within said space, while preheating the fluid to be applied to effect said changes by circulating the fluid in a separate closed path in such heat transfer relation to said space as to cause the temperature of the circulated fluid to approach the temperature of said space.

7. The method of cycling bellows and like units to stress-relieve the same, comprising the steps of heating said bellows, in an externally sealed space, to a temperature in substantial excess of the ambient adjacent temperature and subjecting said bellows as so heated in said space to repeated sub-atmospheric and super-atmospheric fluid pressure changes within said space, while preheating the temperature of said space the fluid substantially to the temperature of said space the fluid to be applied to effect a super-atmospheric pressure phase of said changes by circulating the fluid in a separate closed path in such heat transfer relation to said space as to cause the temperature of the circulated fluid to approach the temperature of said space.

References Cited in the file of this patent

UNITED STATES PATENTS

| 200,914 | Hyatt | Mar. 5, 1878 |
| 2,085,584 | Haskell | June 29, 1937 |
| 2,422,702 | Rodanet | June 24, 1947 |
| 2,534,124 | Hasselhorn | Dec. 12, 1950 |
| 2,625,719 | Moore | Jan. 20, 1953 |

OTHER REFERENCES

Navy Report No. ASL NAM 2425, Part XIV, issued October 4, 1949 (9 page report).